Feb. 26, 1924.
A. F. MASURY
VEHICLE CONSTRUCTION
Filed May 10, 1923 — 2 Sheets-Sheet 1
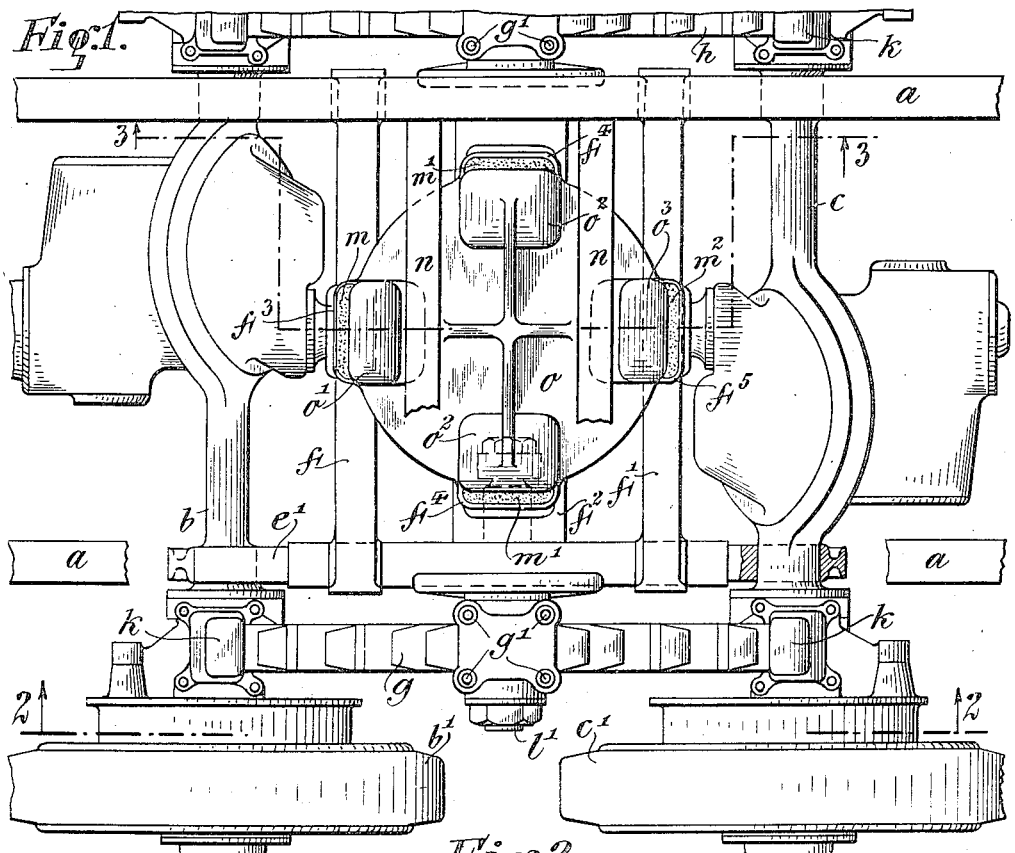
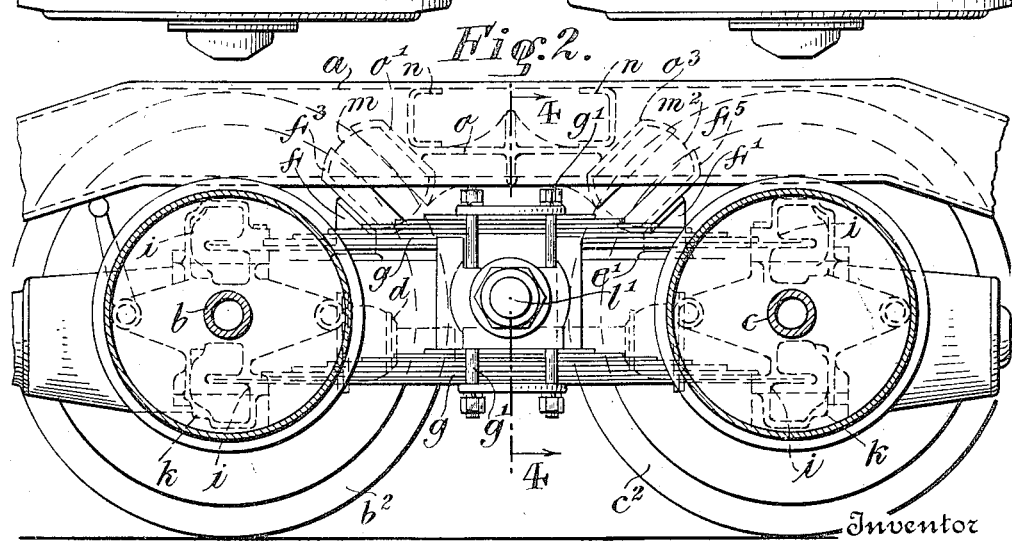

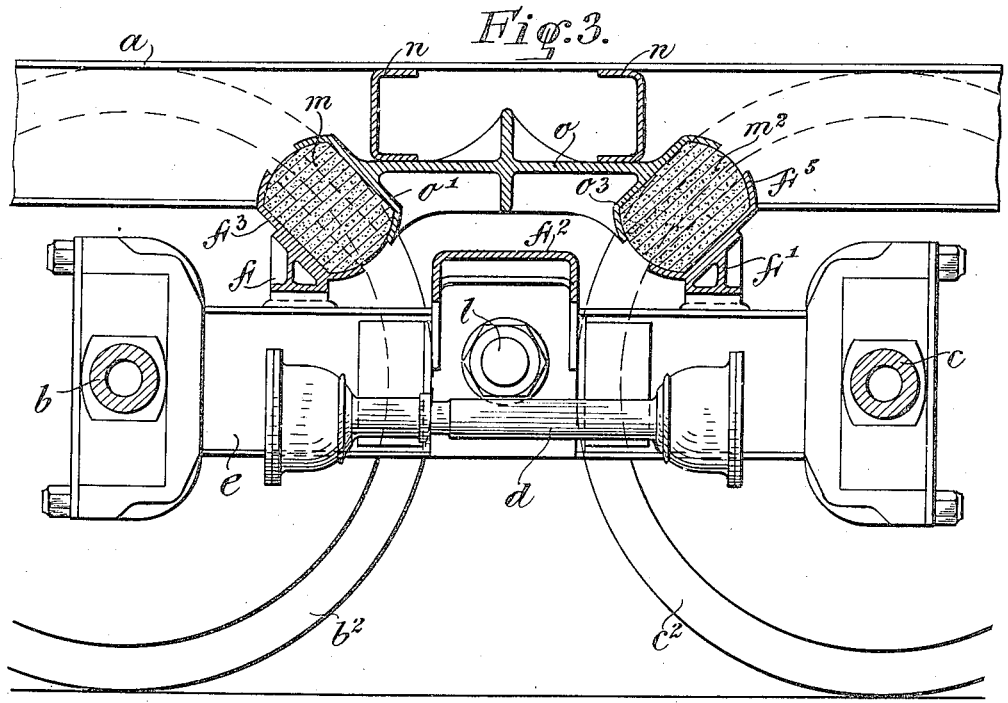
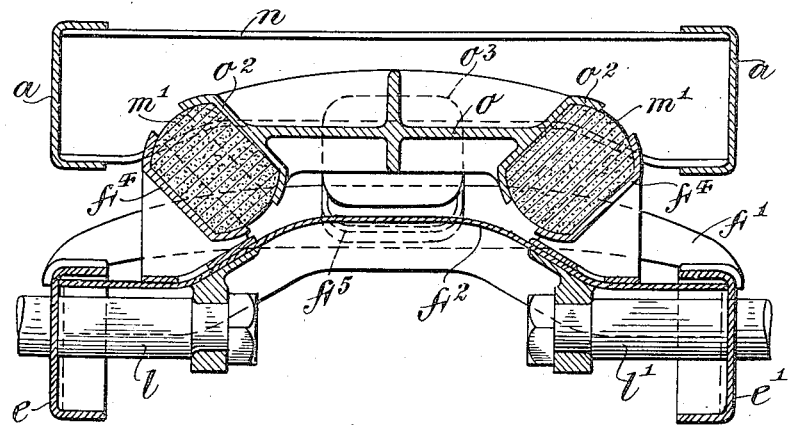

Patented Feb. 26, 1924.

1,484,954

UNITED STATES PATENT OFFICE.

ALFRED F. MASURY, OF NEW YORK, N. Y., ASSIGNOR TO INTERNATIONAL MOTOR COMPANY, OF NEW YORK. N. Y., A CORPORATION OF DELAWARE.

VEHICLE CONSTRUCTION.

Application filed May 10, 1923. Serial No. 637,960.

*To all whom it may concern:*

Be it known that I, ALFRED F. MASURY, a citizen of the United States, residing in the borough of Manhattan, of the city of New York, in the State of New York, have invented certain new and useful Improvements in Vehicle Constructions, of which the following is a specification, reference being had to the accompanying drawings, forming a part hereof.

This invention relates broadly to motor propelled vehicles in which more than two non-steering wheels are used and, more particularly, to motor vehicle construction in which more than two axles are employed at the rear end of the chassis. There is today a trend towards smaller unit ground pressure to enable greater loads to be carried satisfactorily and relieve the road surface to a corresponding degree. It seems that this condition can be developed further only by employing a greater number of wheels since there is a practical limit to the size of the tires. Accordingly, it may develop that two or more such wheels at both the rear end and the front end of the chassis will come into vogue. The wheels at the rear end will preferably be of the non-steering type. The present invention will be described, by way of example, with reference to the use of two rear axles, that is, four rear wheels. One disadvantage of the use of more than two non-steering rear wheels is the great stresses set up during change of direction of the vehicle as when going around a corner. The non-steering wheels at each side of the chassis do not track when the vehicle turns since each pair of wheels is attempting to turn on the same radius. As the front end is steered the rear end in spite of the plurality of non-steering wheels is caused to change direction although an appreciable drag is set up. The object of the present invention is to relieve such a vehicle of the tremendous strains which are otherwise set up by more than two non-steering wheels and to connect the wheels with the chassis in such manner as to afford some degree of flexibility whereby the pairs of wheels on different axles may adapt themselves within limits to the particular strains imposed thereon and, upon the removal of the strains, resume quickly their normal relation to the chassis. A further object of the invention is to connect such non-steering wheels with the chassis so that they will be quickly straightened out for tracking behind the front wheels when the vehicle itself is straightened out after turning. Still another object of the invention is to interpose between a plurality of sets of such non-steering wheels of the chassis a yielding non-metallic connection having resilient properties so that stresses and strains are absorbed to some degree and the parts permitted to accommodate themselves within limits to forces tending to change their relation and, at the same time, be constrained to resume their normal relationship upon the removal of such forces.

In accordance with the invention the axles carrying the non-steering wheels are spaced by distance rods which are so related as to form with other members a sub-frame or bogey truck which is supported by springs on the axles and connected through non-metallic blocks to the main frame of the chassis. In practicing the invention in the most advantageous way it is preferred to connect the springs with the axles through non-metallic cushioning devices so that the desired conditions may be realized to the greatest possible degree. More particularly, the construction is one in which the sub-frame or bogey truck is connected to the main frame or chassis through a kind of fifth wheel which includes yielding non-metallic material of rubber or the like which is so placed as to most effectively transmit the load of the body to the sub-frame and relieve the sub-frame of the strains incidental to changes in direction of the vehicle.

It is to be understood that the improvements may be incorporated in cars which run on rails as well as vehicles which run on the road and that, as may be the case with rail cars, the construction is equally advantageous at the front end where, often, four wheels are provided, as at the rear end.

The invention will be described more fully hereinafter in connection with the accompanying drawings, wherein:

Figure 1 is a view in plan of a vehicle having two axles interconnected and connected with the chassis frame in accordance with the invention.

Figure 2 is a view in section thereof taken on the plane indicated by the line 2—2 of Figure 1 and looking in the direction of the arrows.

Figure 3 is a view in section taken on the planes indicated by the broken lines 3—3 of Figure 1 and looking in the direction of the arrows.

Figure 4 is a view in transverse section of a part of the construction shown in Figure 2 and taken on the plane indicated by the line 4—4 of Figure 2 and looking in the direction of the arrows.

As indicated hereinbefore, the present improvements may be incorporated in a motor propelled vehicle adapted for use on a road or on rails and in which a plurality of non-steering wheels are interconnected by a subframe and disposed either at the front end or the rear end of the chassis. The embodiment illustrated shows four road wheels provided for a motor vehicle at the rear end of the chassis, the wheels being connected with the driving power for propulsion. The invention is not to be thus limited.

The side frame members of the chassis are indicated at $a$, $a$, rear axle tubes at $b$, $c$, and the road wheels thereon at $b'$, $b^2$, $c'$, $c^2$, respectively. These wheels are interconnected through appropriate shafting, a fragment of which is indicated at $d$, for propulsion, although the invention is not to be so limited. The mounting thus far described has been proposed heretofore, in its essentials, but so far as known, it has never been proposed to interconnect such axles as represented at $b$, $c$, by members so as to constitute essentially a bogey truck and then interconnect such a truck with the frame yieldingly for compensation of strains in a manner which will later appear. The side frame members of this bogey truck may comprise longitudinally extending channels $e$, $e'$, which may, in turn, be interconnected by cross members $f$, $f'$. The channels $e$, $e'$, may be connected with the respective axles $b$, $c$, so as to serve as distance members holding the axles in fixed spaced relationship but without preventing relative vertical movement independently between the axles and such channels $e$, $e'$, as appears particularly from Figure 3. The frame above described is supported on the axles $b$, $c$, by means of springs $g$, $h$, disposed at opposite sides thereof. The most effective suspension will include upper and lower springs, as illustrated, which are interconnected by bolts $g'$ and have their ends resting in non-metallic shackles indicated in dotted lines in Figure 2 at $i$ which non-metallic shackles are enclosed within housings $k$ secured to the respective axles all in a manner disclosed generally in Letters Patent of the United States No. 1,404,876 dated January 31, 1922, and, which, while forming specifically no part of the present invention contributes broadly to the advantageous results sought for. The side channels $e$, $e'$, of the bogey truck have secured thereto trunnions $l$, $l'$, which extend laterally from the sides thereof between the respective pairs of springs $g$, $h$, and are connected to the springs. The bogey truck constitutes the support in part for the chassis. The invention is concerned primarily with the means for connecting this truck yieldingly with the chassis so that it will not be constrained to remain in predetermined fixed relationship with respect to the chassis as when the vehicle is changing direction but may move somewhat with respect thereto to compensate for such strains. To this end, non-metallic yielding connections are interposed between the bogey truck and the chassis which are so disposed as to permit the bogey truck to turn somewhat with respect to the chassis as might be the case in a fifth wheel construction but which will normally maintain the wheels in proper traveling position with respect to the chassis. It is recognized that one skilled in the art may practice the improvements by different specific embodiments, the one illustrated herein being shown merely by way of example. On the cross frame members $f$, $f'$, $f^2$, are disposed, respectively, seats $f^3$, $f^4$, $f^5$, for blocks $m$, $m'$, $m^2$, respectively, of non-metallic yielding material such as rubber. These seats are preferably arranged in opposed pairs and are inclined towards one another, respectively, the seats $f^3$, $f^5$, being opposed and the seats $f^4$ on the cross member $f^2$ being opposed. Extending between the side frame members $a$ of the chassis may be cross channels $n$ which carry a plate $o$ having seats $o'$, $o^2$, $o^3$, which are opposed, respectively, to the seats $f^3$, $f^4$, $f^5$, respectively, and receive the rubber blocks $m$, $m'$, $m^2$, respectively. By inclining the seats $f^3$, $f^4$, $f^5$, upwardly and inwardly and inclining the seats $o'$, $o^2$, $o^3$, downwardly and outwardly and interposing the blocks $m$, $m'$, $m^2$, therebetween it will be evident that a very stable support is afforded for the chassis on the bogey truck. The blocks $m$, $m'$, $m^2$, are combined between the respective pairs of seats and held against displacement thereby. Starting and stopping stresses are absorbed effectively by the inclined blocks as are the vertical load stresses.

From the description given it is thought that the broad advantages of the mounting will now be understood. The support of the main chassis is secured through resilient devices which absorb starting and stopping stresses and cushion the load shock both by the blocks $i'$ and the blocks $m$, $m'$, $m^2$. When the vehicle changes direction since the wheels $b'$, $b^2$, $c'$, $c^2$, are non-steering wheels, but are turning respectively, on the same radius, there is a tendency to drag. So far as known, no devices have been proposed compensating for the stresses set up at this time. By the present invention a limited fifth wheel action is afforded in that certain of the blocks m, m', m², will yield in the most effective manner to afford compensation to the wheels in their efforts to track and permit limited movement of the bogey truck as a whole with respect to the chassis. This action is supplemented by the yielding blocks i' which themselves oppose yieldingly movements of the respective axles with respect to the chassis. When the stresses described are removed, as when the vehicle straightens out, the resiliency of the blocks will immediately straighten out the bogey truck with respect to the chassis.

It should be pointed out that the blocks m, m', m², are normally under compression, as illustrated, by the weight of the main frame but, in addition, it may be desirable to confine these blocks permanently under compression aside from the action of gravity inasmuch as it has been found that the action of the blocks is more effective and their life longer when so confined.

Changes in details of construction and arrangement of parts may be made without departing from the spirit of the invention so long as the fundamental relation described herein is maintained and the yielding connection incorporated.

What I claim is:

1. In combination with the frame of a motor propelled vehicle a plurality of supporting axles having non-steering wheels thereon, means to maintain the axles in spaced relationship and non-metallic yielding members interposed operatively between said axles and the main frame to afford capacity for bodily movement of the axles with respect to the frame.

2. In combination with the main frame of a motor propelled vehicle a plurality of supporting axles therefor, non-steering wheels on the axles, a sub-frame interconnecting the axles to maintain them in spaced relationship, and non-metallic yielding material interposed between the sub-frame and the main frame as the supporting units for the main frame and affording limited relative movement of the sub-frame with respect to the main frame.

3. In combination with the main frame of a motor propelled vehicle a plurality of supporting axles therefor, a bogey truck to which said axles are connected, seats carried by the bogey truck, opposed seats carried by the main frame, and non-metallic yielding elements interposed between said seats and confined therein to support the main frame on the bogey truck while affording capacity for limited relative movement therebetween.

4. In combination with the main frame of a motor propelled vehicle a plurality of axles, non-steering wheels mounted thereon, a sub-frame, springs supported by the axles and having a sub-frame connected thereto, non-metallic yielding supporting elements for the ends of the springs carried by the respective axles, and non-metallic yielding elements carried by the sub-frame to support the main frame.

5. In combination with the main frame of a motor propelled vehicle a plurality of axles, non-steering wheels carried with the axles, means to drive all of said axles, springs supported on the axles, non-metallic yielding elements carried on the axles and engaging the ends of the springs, respectively, a sub-frame supported by the springs, a plurality of yielding non-metallic elements seated on the sub-frame, and means carried by the main frame to engage said last named elements for the support of the main frame thereon.

6. In combination with the main frame of a motor propelled vehicle a plurality of axles, non-steering wheels thereon, distance members extending between the axles to maintain them in spaced relationship while permitting vertical movements thereof, cross members connecting said distance members, and a plurality of non-metallic yielding units mounted in spaced relationship, respectively, on said cross members to afford support for the main frame while cushioning vertical and transverse strains transferred from the cross members to the main frame.

7. In combination with the main frame of a motor propelled vehicle a plurality of axles, non-steering wheels thereon, distance members extending between the axles to maintain them in spaced relationship while permitting vertical movements thereof, cross members connecting said distance members, and a plurality of non-metallic yielding units mounted in spaced relationship, respectively, on said cross members to afford support for the main frame while cushioning vertical and transverse strains transferred from the cross members to the main frame, and means to support said yielding elements angularly.

8. In combination with the main frame of a motor propelled vehicle a plurality of axles, non-steering wheels carried with the axles, means to drive all of said axles, springs supported on the axles and operatively engaged with the main frame, means to maintain the axles in spaced relationship and non-metallic yielding members interposed operatively between said axles and the main frame to afford capacity for bodily movement of the axles with respect to the frame.

This specification signed this 8th day of May, A. D. 1923.

ALFRED F. MASURY.